United States Patent
Takahashi (10) Patent No.: US 6,736,130 B2
(45) Date of Patent: May 18, 2004

(54) FRYER

(75) Inventor: Akito Takahashi, Nagoya (JP)

(73) Assignee: Paloma Industries, Limited, Aichi (JP)

( * ) Notice: Subject to any disclaimer, the term of this patent is extended or adjusted under 35 U.S.C. 154(b) by 43 days.

(21) Appl. No.: 10/051,432

(22) Filed: Jan. 18, 2002

(65) Prior Publication Data

US 2002/0096170 A1 Jul. 25, 2002

(30) Foreign Application Priority Data

Jan. 19, 2001 (JP) ........................................ 2001-010973

(51) Int. Cl.$^7$ .............................................. A47J 27/026
(52) U.S. Cl. ............................... 126/391.1; 126/390.1; 99/408
(58) Field of Search .......................... 126/391.1, 390.1, 126/376.1, 357.1; 99/403, 408

(56) References Cited

U.S. PATENT DOCUMENTS

| | | | | |
|---|---|---|---|---|
| 1,994,555 A | * | 3/1935 | Wilson ..................... | 126/391.1 |
| 2,652,767 A | * | 9/1953 | Childs ......................... | 99/408 |
| 4,091,801 A | * | 5/1978 | Lazaridis et al. ........ | 126/390.1 |
| 4,397,299 A | * | 8/1983 | Taylor et al. ............. | 126/390.1 |
| 4,848,318 A | | 7/1989 | Brewer ..................... | 126/390.1 |
| 4,913,041 A | | 4/1990 | Taber et al. ................ | 99/403 |
| 4,976,609 A | | 12/1990 | Grob et al. ............... | 126/373.1 |
| 5,101,558 A | | 4/1992 | Grob et al. ............... | 29/890.02 |
| 5,544,567 A | | 8/1996 | Davis et al. .................. | 99/403 |
| 5,724,887 A | * | 3/1998 | Hakvoort ...................... | 99/403 |
| 6,044,839 A | * | 4/2000 | Furuhashi ................ | 126/378.1 |
| 6,073,541 A | * | 6/2000 | Oiwa ........................... | 99/408 |
| 6,182,561 B1 | * | 2/2001 | Garner et al. ................. | 99/408 |

FOREIGN PATENT DOCUMENTS

| | | | | |
|---|---|---|---|---|
| WO | WO 96/39070 A1 | * | 12/1996 | ............ A47J/37/12 |
| WO | 0 919 173 A1 | * | 6/1999 | ............ A47J/37/12 |

* cited by examiner

*Primary Examiner*—Josiah Cocks
(74) *Attorney, Agent, or Firm*—Pearson & Pearson, LLP (57) ABSTRACT

The primary object of the present invention is to provide an inexpensive fryer, and a further object is to improve thermal efficiency and make cleanup easier. A box-shaped oil vat 10 in which cooking oil is filled has a bottom wall portion 11 that is formed sloping downward toward the rear of the fryer. A burner 20 is provided at the bottom wall portion 11, with which a wide heating area can be secured. An exhaust duct 30 for conveying combustion gas from the burner 20 to the outside the fryer is provided around the oil vat 10 for securing the heated area. With this configuration, it is possible to inhibit the radiation of heat from the cooking oil while promoting the heat exchange between the combustion gas and the cooking oil. Moreover, the cooking oil can be adequately heated by simply providing a single burner 20, so manufacturing costs are not increased.

3 Claims, 10 Drawing Sheets

FRYER

BACKGROUND OF THE INVENTION

1. Field of the Invention

The present invention relates to a fryer in which cooking oil filled into an oil vat is heated by a burner to cook foods.

2. Description of Related Art

Figure 10:
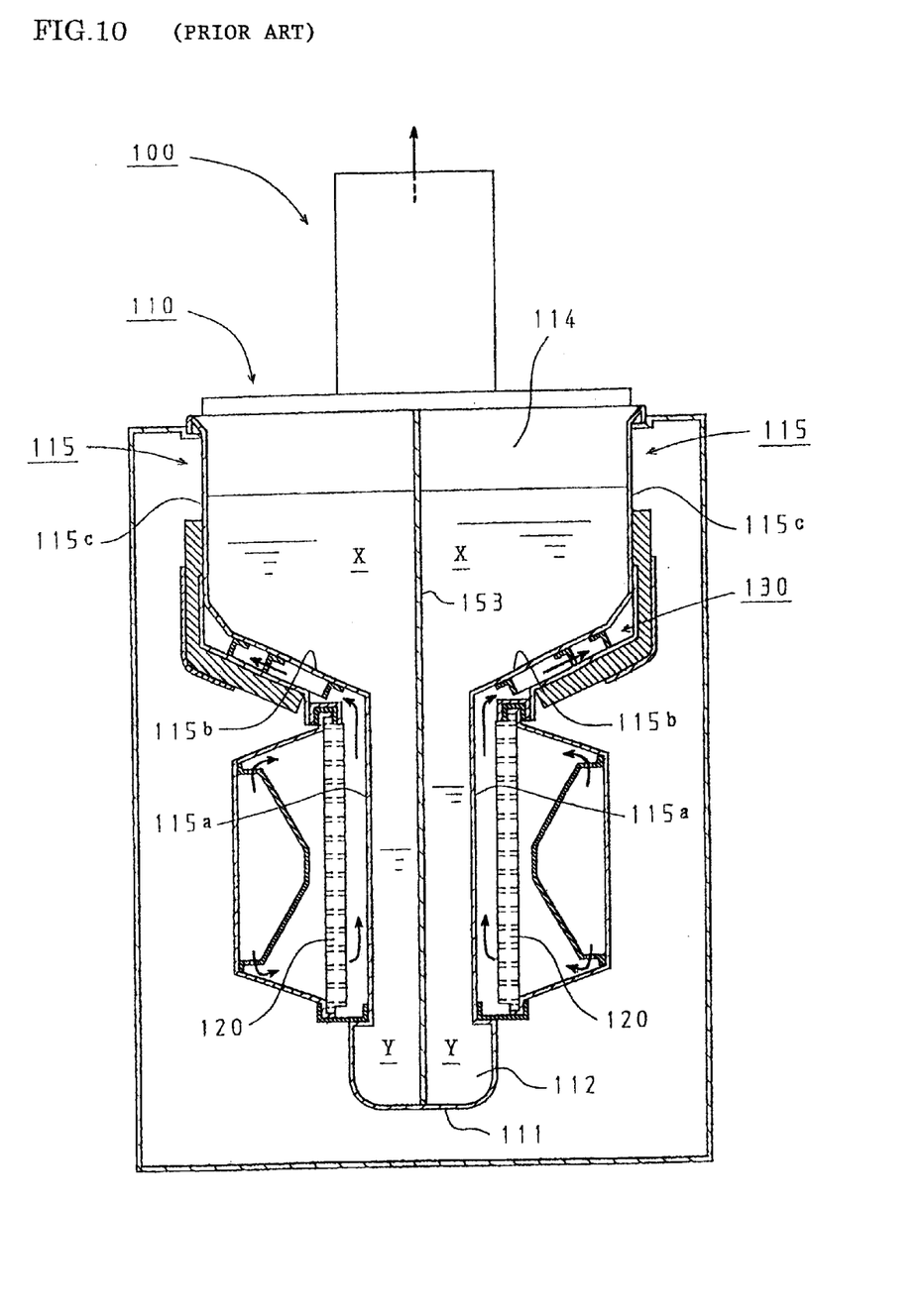
FIG. 10 is a cross section view of a conventional fryer seen from the front.

FIG. 10 shows a conventionally known fryer 100, which is provided with an oil vat 110 for containing cooking oil for deep frying foods such as French fries or chicken, and in which burners 120 are operated to heat the cooking oil from outside the oil vat 110.

The oil vat 110 can be divided broadly into opposing left and right side wall portions 115, a vertically formed front wall portion (not shown in the drawing), a rear wall portion 114 in opposition to the front wall portion, and a bottom wall portion 111.

The side wall portions 115 of the oil vat 110 are each made of an upper side wall portion 115c forming a vertical wall, an oblique middle side wall portion 115b sloping downward from the upper side wall portion 115c, and a lower side wall portion 116a extending vertically from the bottom end of the middle side wall portion 115b. The region enclosed by the upper side wall portions 115c, the middle side wall portions 115b, the front wall portion, and the rear wall portion 114 serves as the cooking zone X.

A narrow vat portion 112 is formed in the lower part of the oil vat 110, surrounded by the left and right lower side wall portions 115a and the bottom wall portion 111, and extending in the depth direction.

A pair of burners 120 for heating the cooking oil is provided on the left and right side of the lower side wall portions 115a. The region below the burners 120 in the narrow vat portion 112 is formed as a cold zone Y that is scarcely heated, and can hold oil sediment generated by the foods during cooking, preventing deterioration of the cooking oil.

An exhaust duct 130 is provided outside the oil vat 110. The exhaust duct 130 conveys combustion gas from the burner 120 to the rear wall portion 114 via the middle side wall portion 115b, and discharges the combustion gas outside the fryer.

The fryer 100, however, is provided with burners 120 on both the left and right side of the oil vat 110, which together with related parts make the fryer expensive.

Also, even though the combustion gas rises from both the left and the right side of the narrow vat portions 112 (lower side wall portion 115a) and flows toward the bottom wall (middle side wall portion 115b) of the cooking zone, primarily only the left and right side wall portions are used for the exchange of heat between the combustion gas and the cooking oil, so the thermal efficiency is not very high.

An additional problem is that in fryers in which the oil vat 110 is partitioned into left and right vats by a partitioning plate 153 (known as a "split vat" type fryer), the narrow cold zone Y becomes even narrower, making it difficult to clean out the oil sediment.

It is a primary object of the fryer of the present invention to solve the aforementioned problems and to provide an inexpensive fryer, and a further object thereof to improve thermal efficiency and make cleaning easier.

SUMMARY OF THE INVENTION

A fryer according to claim 1 of the present invention for solving the above problems is characterized by including:

a box-shaped oil vat into which cooking oil is filled and having left and right side wall portions, a front wall portion, a rear wall portion, and a bottom wall portion, wherein the bottom wall portion is sloped downward in a rearward direction, and an oil sediment holding portion for holding oil sediment is formed at a lower end of the bottom wall portion;

a burner, which is provided in opposition to the oil vat bottom wall portion from the outside and which heats the bottom wall portion by combustion; and an exhaust duct for heat exchange, which brings combustion gas from the burner into contact with the left and right side wall portions and the rear wall portion of the oil vat, after which it is discharged to outside the fryer.

In a fryer according to claim 2 of the present invention, the fryer according to claim 1 is further provided with a predetermined gap extending from left to right between the lower end of the bottom wall portion of the oil vat and the rear wall portion of the oil vat, and the oil sediment holding portion is formed in this gap.

In a fryer according to claim 3 of the present invention, the fryer according to claim 2 is further provided with a partitioning plate for partitioning the oil vat having the oil sediment holding portion extending from left to right into left and right oil vat portions, and wherein the left and right oil vat portions are independently heated by the burner.

In the fryer according to claim 1 of the present invention with the above configuration, the bottom wall portion of the oil vat is heated by combustion with the burner, and the combustion gas generated at that time is conveyed from the bottom wall portion of the oil vat to the left and right side wall portions and the rear wall portion, and then discharged outside of the fryer.

Thus, because an exhaust duct for conveying the combustion gas around the oil vat is provided and secures a sufficient heated area, the cooking oil can be sufficiently heated simply by providing a single burner.

Oil sediment generated from the foods during cooking is guided along the downward sloping oil vat bottom wall portion and toward the rear of the oil vat, and is accumulated in the oil sediment holding portion that is formed to the lower end of the oil vat bottom wall portion.

In the fryer according to claim 2 of the present invention, the oil sediment holding portion extends along the rear wall portion of the oil vat, so that a united wide space for disposing a burner along the oil vat bottom wall portion is formed in front of the oil sediment holding portion, and the cooking oil is sufficiently heated.

Oil sediment that sinks to the oil vat bottom wall portion drops into the oil sediment holding portion without stopping.

The fryer according to claim 3 of the present invention is configured having a split type oil vat in which the oil vat has been divided into left and right vat portions by a partitioning plate, and because the oil sediment holding portion extends to the left and right, the partitioning plate is provided intersecting the oil sediment holding portion in the direction in which it extends. Thus, the width of the oil sediment holding portion is not narrowed, and it is easy to clean out the inside of the oil sediment holding portion.

DESCRIPTION OF THE PREFERRED EMBODIMENTS

The configuration and operation of the present invention as described above will become clearer through the following description of preferred embodiments of the fryer of the present invention.

First Embodiment

A first embodiment of a fryer according to the present invention will be described with reference to FIGS. 1 to 3.

Figure 1:
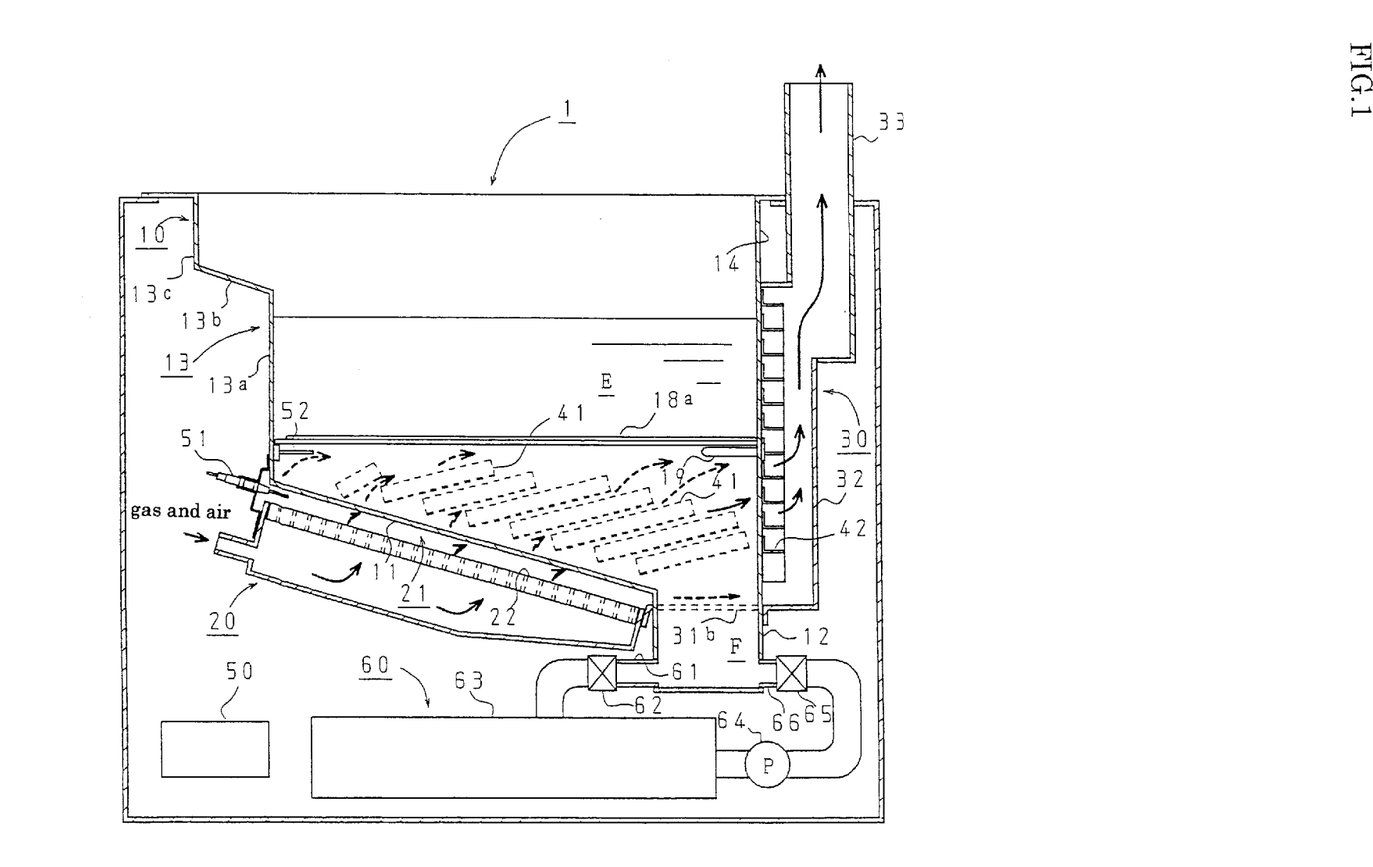
FIG. 1 is a cross section view of the fryer according to the first embodiment seen from the side.
Figure 2:
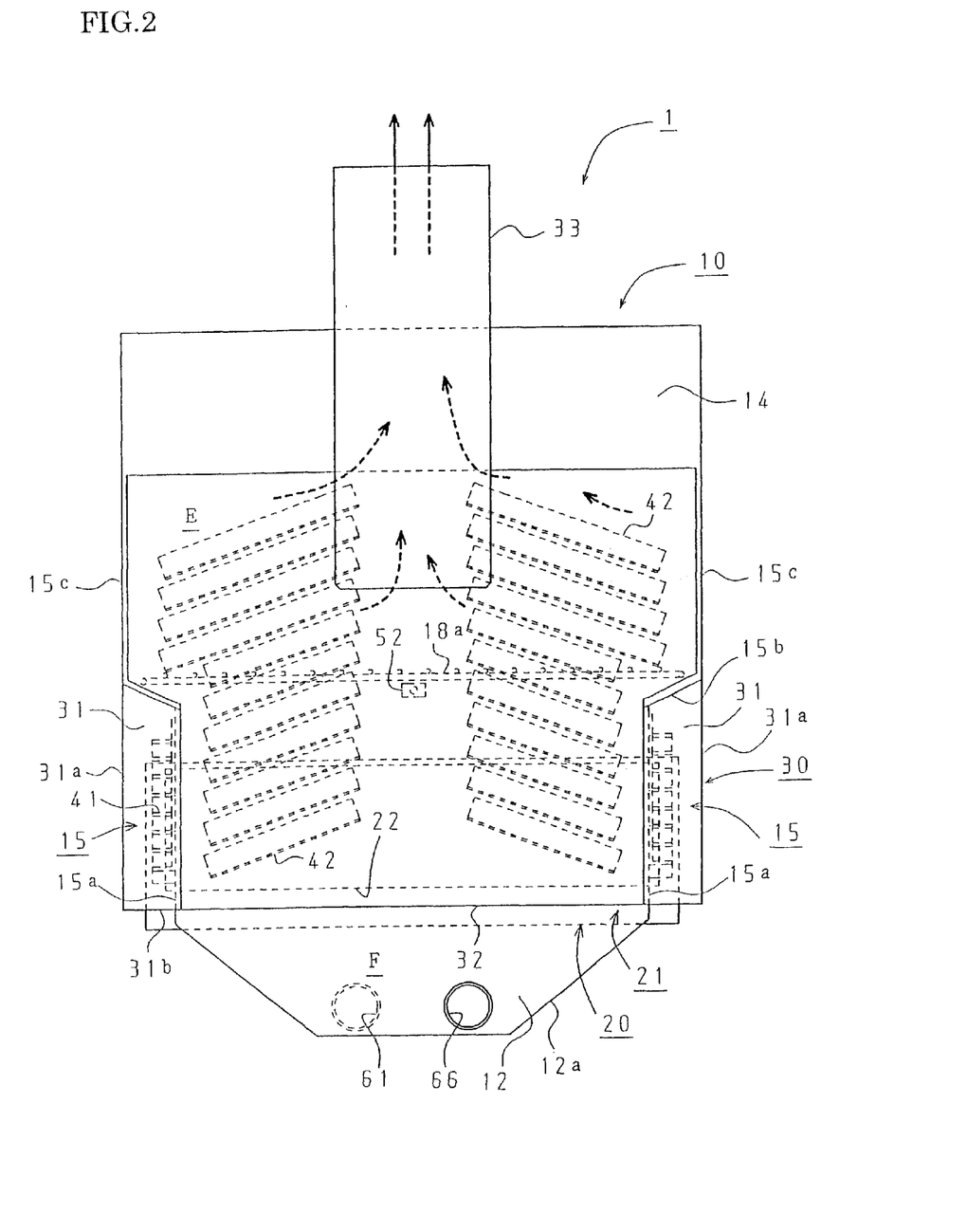
FIG. 2 is a diagram of the fryer according to the first embodiment seen from behind.

As shown in FIG. 1, a fryer 1 is provided with a box-shaped oil vat 10 into which cooking oil is filled; a burner 20, which is provided on the outside in opposition to a later-mentioned oil vat bottom wall portion 11 and is for heating the cooking oil; an exhaust duct 30, which conveys combustion gas from the burner 20 to the outside of the fryer and which heats the cooking oil during conveying of the gas; a controller 50 for controlling cooking time and the cooking temperature; and a filtration/circulation device 60, which is provided below the oil vat 10 and is for filtering the cooking oil. It should be noted that the left side in FIG. 1 corresponds to the front of the fryer, and is the area in which the fryer operator performs the task of cooking foods.

Figure 3:
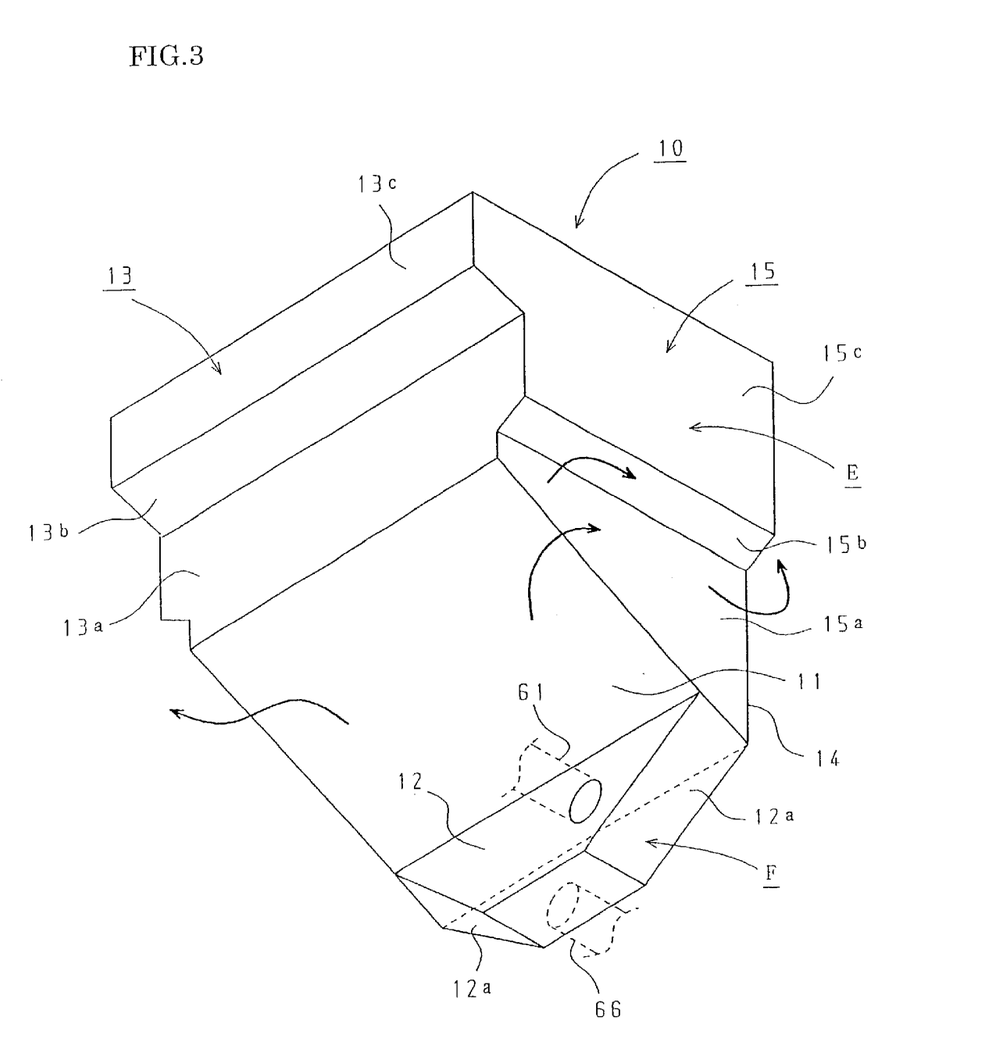
FIG. 3 is a perspective view of the oil vat of the first embodiment viewed downward toward the front.

Broadly speaking, the oil vat 10 is made up of the bottom wall portion 11, an oil sediment holding portion 12, a front wall portion 13, a rear wall portion 14, and left and right side wall portions 15, as illustrated in FIG. 3.

The front wall portion 13 of the oil vat 10 is provided with a slope for sliding in foods at an intermediate position, and is configured, in order from the top, by an upper front wall portion 13c extending vertically, a middle front wall portion 13b bending from the bottom end of the upper front wall portion 13c and sloping downward to the rear, and a lower front wall portion 13a extending vertically from the bottom end of the middle front wall portion 13b.

The left and right side wall portions 15 of the oil vat 10 each have a step portion that forms the exhaust duct 30, and from the top the side wall portions are configured by an upper side wall portion 15c serving as a vertical wall, a middle side wall portion 15b bending from the bottom end of the upper side wall portion 15c and sloping downward toward the middle, and a lower side wall portion 15a extending vertically from the bottom end of the middle side wall portion 15b.

The rear wall portion 14 of the oil vat 10 is a vertical flat wall that is connected to the rear ends of the left and right side wall portions.

The bottom wall portion 11 of the oil vat 10 is flat and is connected to the bottom end of the lower side wall portions 15a and slopes downward to the rear of the oil vat 10. The bottom end forming the rear end of the bottom wall portion 11 is formed at a predetermined spacing from the rear wall portion 14 of the oil vat 10.

The oil sediment holding portion 12 is formed between the bottom end of the bottom wall portion 11 and the rear wall portion 14, and holds the oil sediment. The oil sediment holding portion 12 is shaped like a trench extending from left to right, and is provided with left and right bottom surfaces 12a which slope downward toward the center.

As shown in FIG. 1, the burner 20 is an all primary air burner with ceramic plates 22 provided as the combustion surface, in which a plurality of burner ports are formed. The combustion surface is provided opposing and at a predetermined spacing from the bottom wall portion 11 of the oil vat 10, forming a combustion chamber 21 therebetween. An ignition electrode 51 is provided in the combustion chamber 21 and faces the ceramic plate 22.

Combustion gas from the burner 20 is conveyed outside the fryer by the exhaust duct 30. As shown in FIG. 2, the exhausted duct 30 is configured by left and right ducts 31, which are connected with the combustion chamber 21 below the oil vat 10 and provided to the left and right outside of the oil vat 10; a rear duct 32 connected with the left and right ducts 31, which is provided behind the oil vat 10; and a vertically extending exhaust flue 33, which is connected with the rear duct 32 and is open at its upper end.

Duct side panels 31a, which are in opposition to and at a predetermined spacing from the bottom side wall portion 15a; and are substantially coplanar to the upper side wall portions 15c, are provided outside the oil vat 10 to the left and right. A duct rear panel 31b that is shaped like a box with an open front and top portion is provided to the rear of the oil vat 10. The duct rear panel 31b is formed such that its left and right walls are in contact with the rear wall portion 14, and its bottom wall is in contact with the rear end of the burner 20. The left and right ducts 31 are formed by the space enclosed within the duct side panels 31a, the duct rear panel 31b and the lower side wall portions 15a of the oil vat 10, and the middle side wall portions 15b.

On the other hand, the rear duct 32 is formed by the space enclosed by the rear wall portion 14 of the oil vat 10 and the duct rear panel 31b. The exhaust flue 33 is not as wide as the rear duct 32.

Side fins 41 are provided in the left and right ducts 31 and welded to the lower side wall portions 15a of the oil vat 10 and slope upward to the rear. Rear fins 42 provided in the rear duct 32 are welded in rows to the left and right sides of the rear wall portion 14 of the oil vat 10 parallel to one another and sloping upward toward the center. The fins 41 and 42 are provided with L-shaped profiles, promoting the heat exchange between the combustion gas and the cooking oil.

Inside the oil vat 10 a wire netting 18a is provided for holding foods or a basket (not shown in the drawings) with foods, which is supported by a wire netting support 19 (see FIG. 1) provided on the rear wall portion 14 and by the left and right middle side wall portions 15b.

The region enclosed by the wire netting 18a, the lower front wall portion 13a, the upper side wall portions 15c, and the rear wall portion 14 functions as a cooking zone E.

A thermistor 52 for detecting the temperature of the cooking oil is provided on the lower front wall portion 13a below the wire netting 18a.

The filtration/circulation device 60 includes an inlet pipe 61 provided in the center of the bottom of the front wall of the oil sediment holding portion 12, an outlet pipe 66 provided in the center of the bottom of the rear wall of the oil sediment holding portion 12, a filter device 63, which has a filter (not shown in the drawings) and filtrates the cooking oil supplied from the inlet pipe 61, and a pump 64 for returning the filtered cooking oil to the oil vat 10 via the outlet pipe 66. The inlet pipe 61 and the outlet pipe 66 are provided with valves 62 and 65, respectively.

In the fryer 1 of the above-described configuration, once cooking oil has been filled into the oil vat 10, the burner 20 is ignited and combustion gas is delivered from the combustion chamber 21 to the left and right ducts 31 and the rear duct 32 to heat the cooking oil via the bottom wall portion 11, the lower side wall portions 15a, the middle side wall portions 15b, and the rear wall portion 14 of the oil vat 10, after which the combustion gas is discharged from the exhaust flue 33.

After the cooking oil has been heated, foods are placed into a basket (not shown in the drawings) and submerged into the oil vat 10 for cooking. Alternatively, to keep the cooking oil from spattering from the vat, foods such as croquettes are slid down the middle front wall portion 13b and into the cooking zone E for cooking.

The foods are cooked in the high temperature oil, and after a predetermined amount of time has passed, an alarm sounds and the fryer operator retrieves the foods from the oil vat 10, thereby ending foods preparation.

Combustion gas from the burner 20 is conveyed from the combustion chamber 21 into the exhaust duct 30, thus surrounding the entire area of the oil vat 10 below the cooking zone E. As a result, the area heated by the combustion gas is increased and thermal efficiency is improved, and thus energy is saved.

The L-shaped side fins 41 and rear fins 42 are provided obliquely on the lower side wall portions 15a and the rear wall portion 14, so the rising high-temperature combustion gas is not only guided to the rear duct 32, but can be reliably brought into contact with the entire heat receiving surface of the fins 41 and 42. The result is that the heat exchange between the combustion gas and the cooking oil is both greatly promoted and is efficient.

According to the above fryer of the present embodiment, a sufficient heating area can be secured in the exhaust duct 30 surrounding the perimeter of the oil vat 10, so the cooking oil can be adequately heated even if the burner 20 is provided only in one location. Consequently, it is not necessary to provide a plurality of burners, so that manufacturing costs can be held down.

Moreover, the left and right ducts 31 can be disposed without protruding beyond the width of cooking zone E (the distance between the left and right upper side wall portions 15c of the oil vat 10), so that the fryer becomes compact.

Oil sediment generated from foods during cooking sinks down under its own weight and is conveyed along the walls of the oil vat 10, being accumulated in the oil sediment holding portion 12. The oil sediment holding portion 12 is a cold zone F which is hardly heated by the burner 20, and moreover hardly circulates the cooking oil, so that the collected oil sediment does not return into the high-temperature cooking zone E to be reheated. The result is that deterioration of the cooking oil can be prevented.

It is also easy to clean out the oil sediment that accumulates in the cold zone F.

That is, in the conventional fryer 100 shown in FIG. 10, the narrow vat portion 112 is sandwiched between the left and right burners 120 and therefore becomes a rectangular parallelepiped which has a narrow horizontal width and large depth, and moreover the cold zone Y is below the area heated by the burner 120, so the narrow vat portion 112 becomes extremely deep and therefore very difficult to clean out.

On the other hand, as shown in FIG. 1, the oil sediment holding portion 12 of the present embodiment is shallow because it is provided not below but rather behind the burner 20 provided at the bottom wall portion 11 of the oil vat 10. Further, as shown in FIG. 2, the oil sediment holding portion 12 has a large width because it is not sandwiched from the left and right between two burners 20. Consequently, cleaning tools can reach all the way to the bottom surface 12a of the oil sediment holding portion 12, thus making cleanup easy.

Furthermore, because the oil sediment holding portion 12 extends from left to right along the oil vat rear wall portion 14, the space in front of the oil sediment holding portion 12 for disposing the burner along the oil vat bottom wall portion 11 is formed in the shape of a large rectangle. Thus, it is possible to secure a large area heated by the burner 20. Moreover, the burner 20 is not given a complicated shape, so manufacturing costs for the burner 20 can be kept down.

The bottom surface 12a of the oil sediment holding portion 12 slopes downward toward the center, so during the discharge of the cooking oil the cooking oil naturally collects in the center and easily flows toward the inlet pipe 61.

Second Embodiment

A second embodiment will be explained next with reference to FIGS. 4 to 6. It should be noted that areas different from the first embodiment would be explained, whereas overlapping components are given the same numerals and their explanation has been omitted. A fryer 2 according to the second embodiment is characterized in that a fryer 1 of the first embodiment is provided with a partitioning plate 16 and a cover plate 17, which are described later As illustrated in FIG. 5, the fryer 2 includes a partitioning plate 16 for dividing the oil vat 10 into a left oil vat portion 10L and a right oil vat 10R, and cover plates 17L and 17R (referred to generically as the cover plates 17) provided at a certain spacing from the bottom wall portion 11, which is the surface heated by the burner 20.

Figure 4:
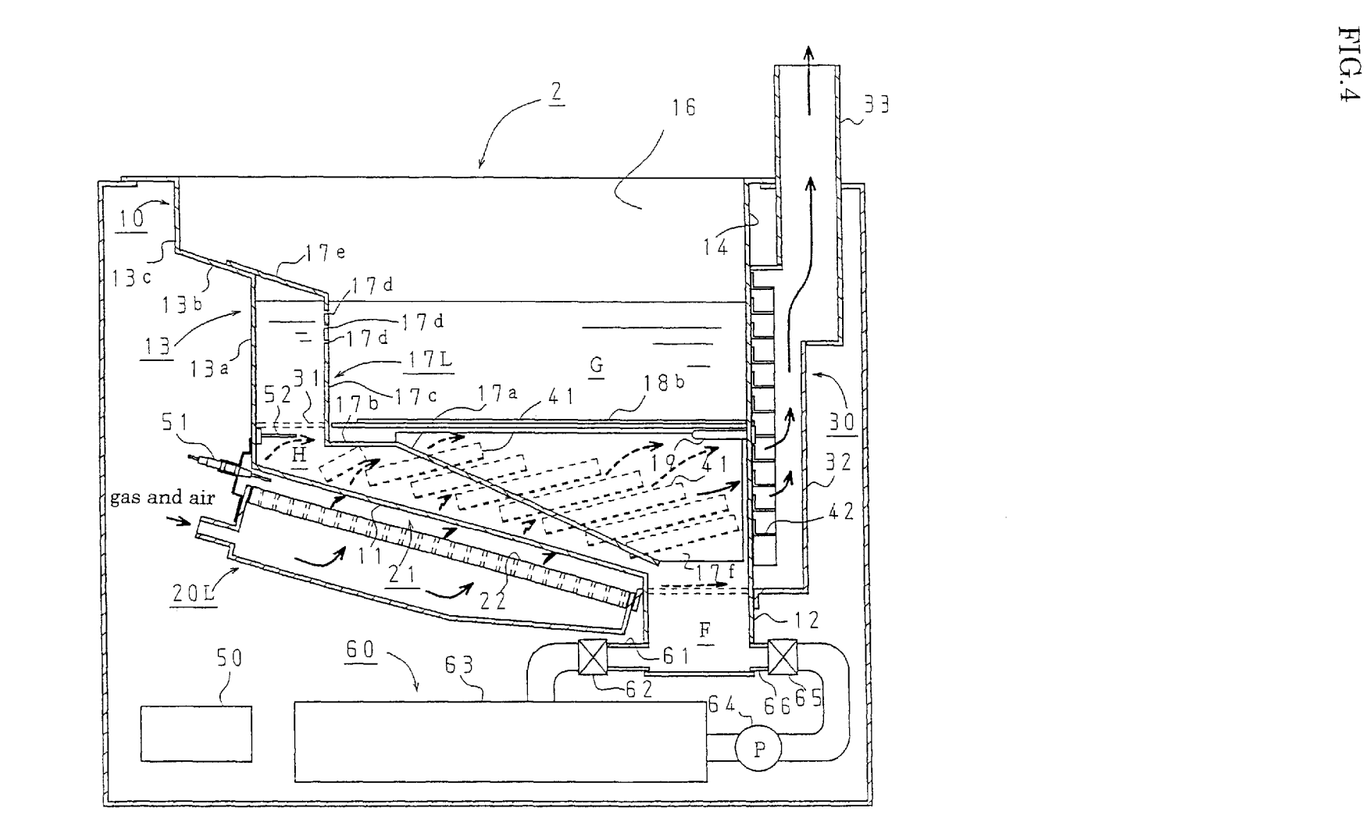
FIG. 4 is a cross section view of the fryer according to the second embodiment seen from the side.
Figure 5:
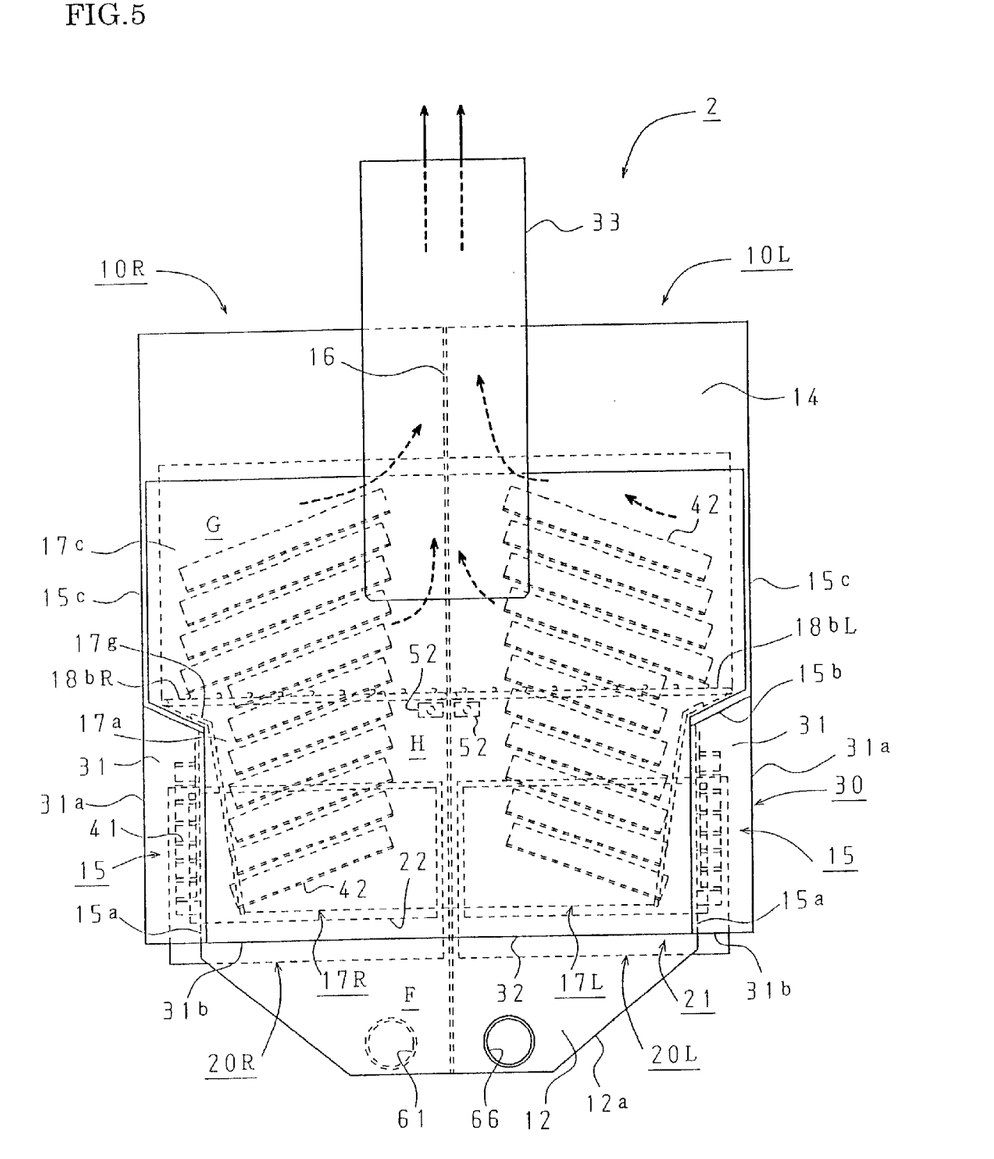
FIG. 5 is a diagram of the fryer according to the second embodiment seen from behind.
Figure 6:
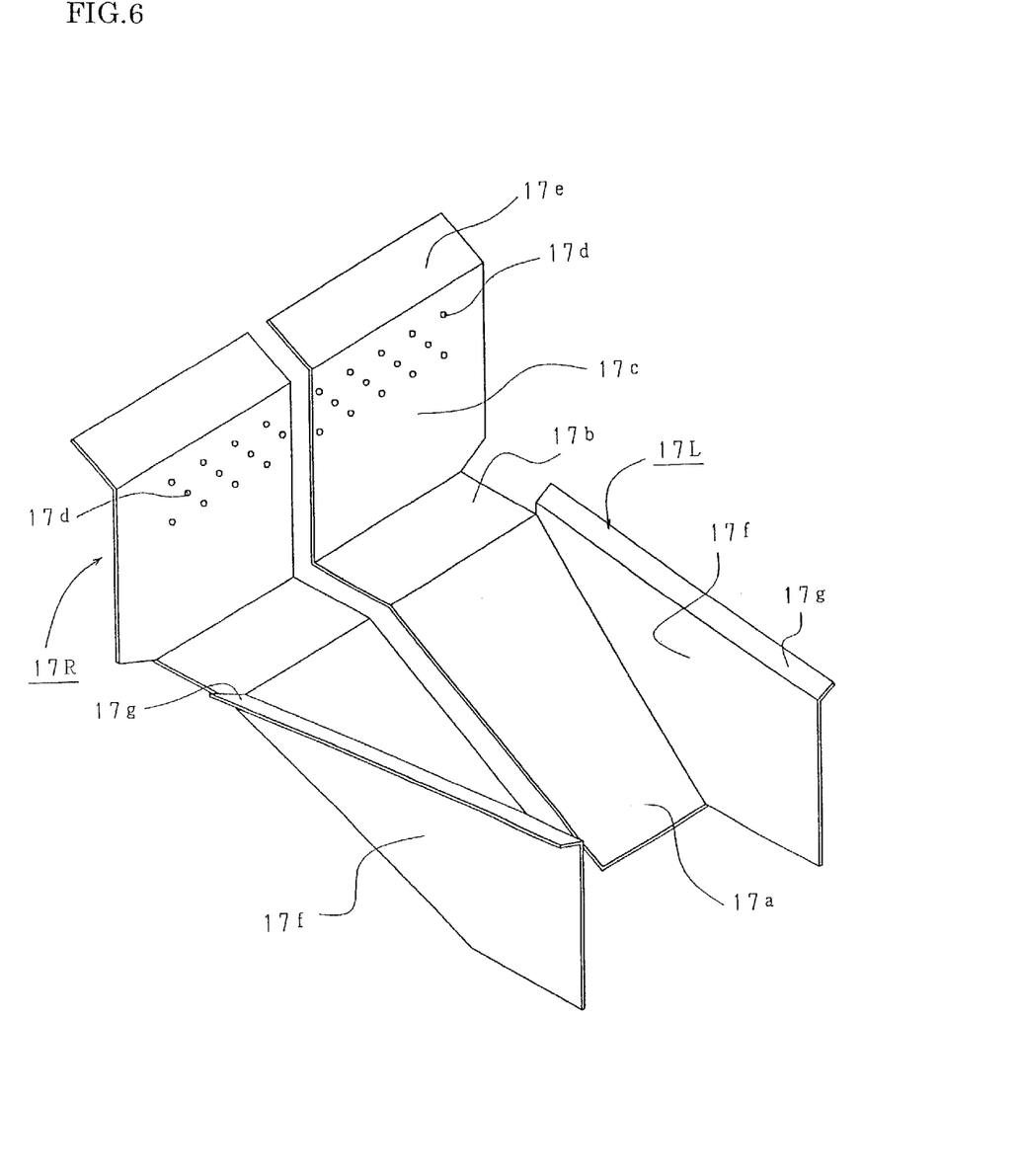
FIG. 6 is a perspective view of the cover plate.

As shown in FIGS. 4 and 6, each cover plate 17 has a sloped wall 17a arranged in opposition to the bottom wall portion 11, a horizontal surface 17b extending horizontally from the upper end of the sloped wall 17a, a vertical wall 17c extending vertically from the front end of the horizontal surface 17b and in opposition to the lower front wall portion 13a of the oil vat 10, an upper wall 17e which is in contact with the middle front wall portion 13b, a side wall portion 17f disposed outside the sloped wall 17a, and a catching wall 17g extending obliquely upward from the side wall 17f toward the left or right outer side of the oil vat. The vertical wall 17c is provided, on its upper side only, with a plurality of holes 17d that are small enough so that the oil sediment cannot pass through them.

The cover plates 17 are supported by placing the catching wall 17g on the middle side wall portions 15b of the oil vat 10.

The burner is in the same position as in the first embodiment, and is partitioned into left and right burners 20L and 20R corresponding to the left oil vat portion 10L and the right oil vat portion 10R, respectively, the combustion of each burner being separately controlled by the controller 50.

The left oil vat portion 10L and the right oil vat portion 10R are provided with wire netting 18bL and 18bR for holding foods, the wire netting being supported by the horizontal surface 17b of the cover plates 17 and the wire netting supports 19.

The region surrounded by the cover plates 17, the wire netting 18, the upper side wall portions 15c, and the rear wall portion 14 functions as a cooking zone G. A heating zone H is formed between the bottom wall portion 11 and the cover plates 17 and is separated from the cooking zone G.

The fryer 2 with the above configuration is a split vat type fryer in which the oil vat 10 is divided into left and right oil vat portions, so that the left burner 20L heats the left oil vat portion 10L, and the right burner 20R heats the right oil vat portion 10R, thereby making it possible to simultaneously cook two types of foods at different temperatures in the left and right oil vats 10.

It is also possible to use either the left oil vat portion 10L or the right oil vat portion 10R when cooking a small quantity of foods.

The heating zone H and the cooking zone G are partitioned by the cover plates 17, however, the zones are connected with one another via the area between the bottom end of the sloped wall 17a and the rear wall portion 14 of the oil vat 10 (the area above the oil sediment holding portion 12) and the holes 17d provided in the vertical wall 17c. Thus, the heated cooking oil can be circulated throughout the oil vat 10.

When heated by the burners 20, however, the cooking oil rises up along the bottom wall portion 11. Thus, if the cover plates 17 are not provided, then there is a risk that the oil sediment that sinks onto the bottom wall portion 11 will have its own weight counterpoised by the rising current of the cooking oil, thereby causing it to accumulate, burn, and stick to the high-temperature bottom wall portion 11.

Accordingly, the fryer 2 of the second embodiment is provided with the cover plates 17 so that the oil sediment does not sink directly onto high-temperature bottom wall portion 11. Thus, the oil sediment smoothly rolls down the sloped wall 17a and is collected in the oil sediment holding portion 12. Consequently, it becomes difficult for the oil vats 10 to become dirty, with the advantage that they do not have to be thoroughly cleaned often.

The conventional fryer 100 shown in FIG. 10 is a split vat type fryer, in which cleanup work is extremely difficult because the width of the narrow vat portion 112 in which the oil sediment accumulates becomes even more narrow than that of a full vat type fryer in which the oil vat is not divided.

On the other hand, although the fryer 2 of the present embodiment shown in FIG. 5 is also a split vat type fryer in which the oil sediment holding portion 12 is split into left and right portions by the partitioning plate 16, the width of each oil sediment holding portion 12 is adequately large because the oil sediment holding portion 12 is formed extending to the left and right. As a result, there is hardly any change in the degree of ease with which cleanup work can be carried out compared to the full vat type fryer of the first embodiment.

Third Embodiment

Figure 7:
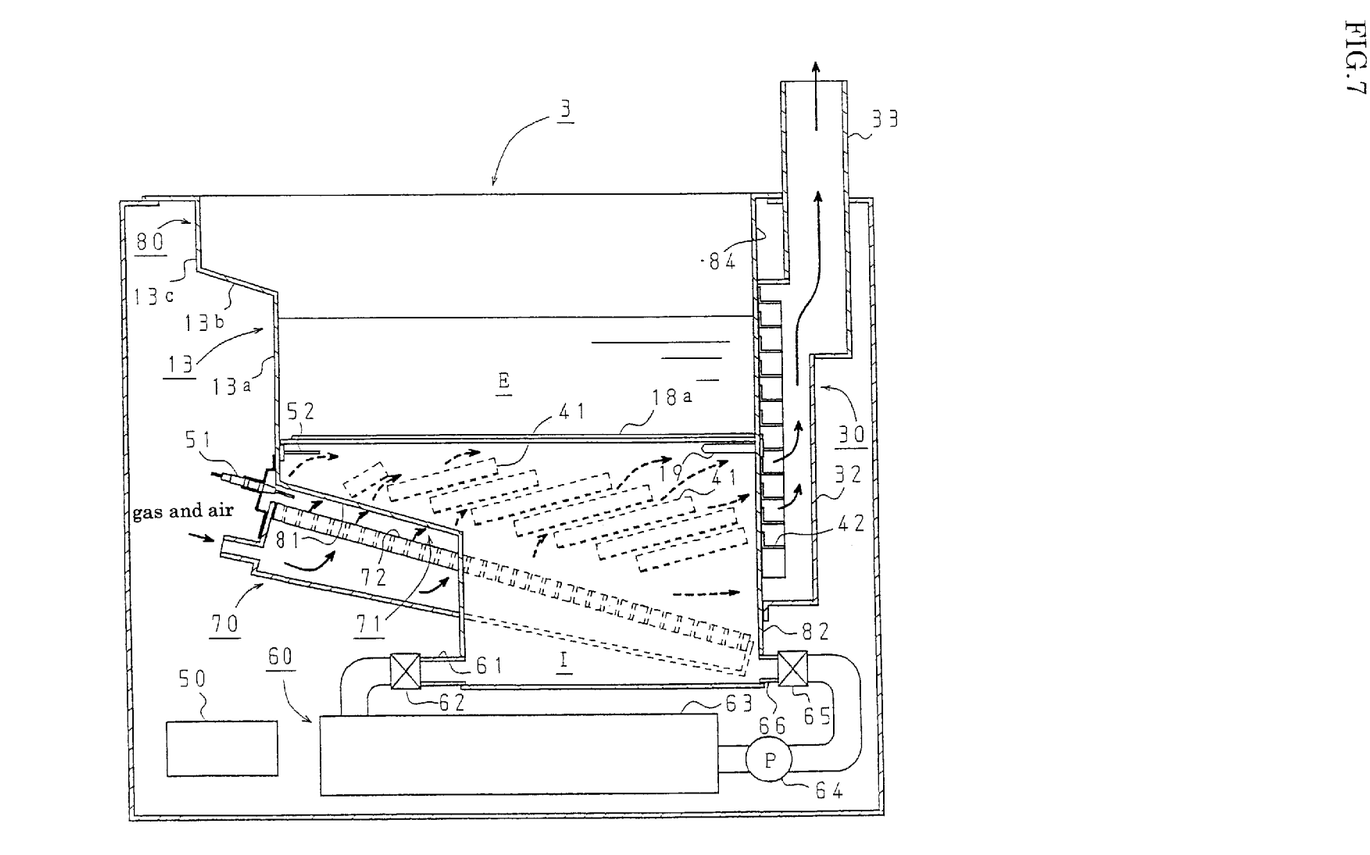
FIG. 7 is a cross section view of the fryer according to the third embodiment seen from the side.
Figure 8:
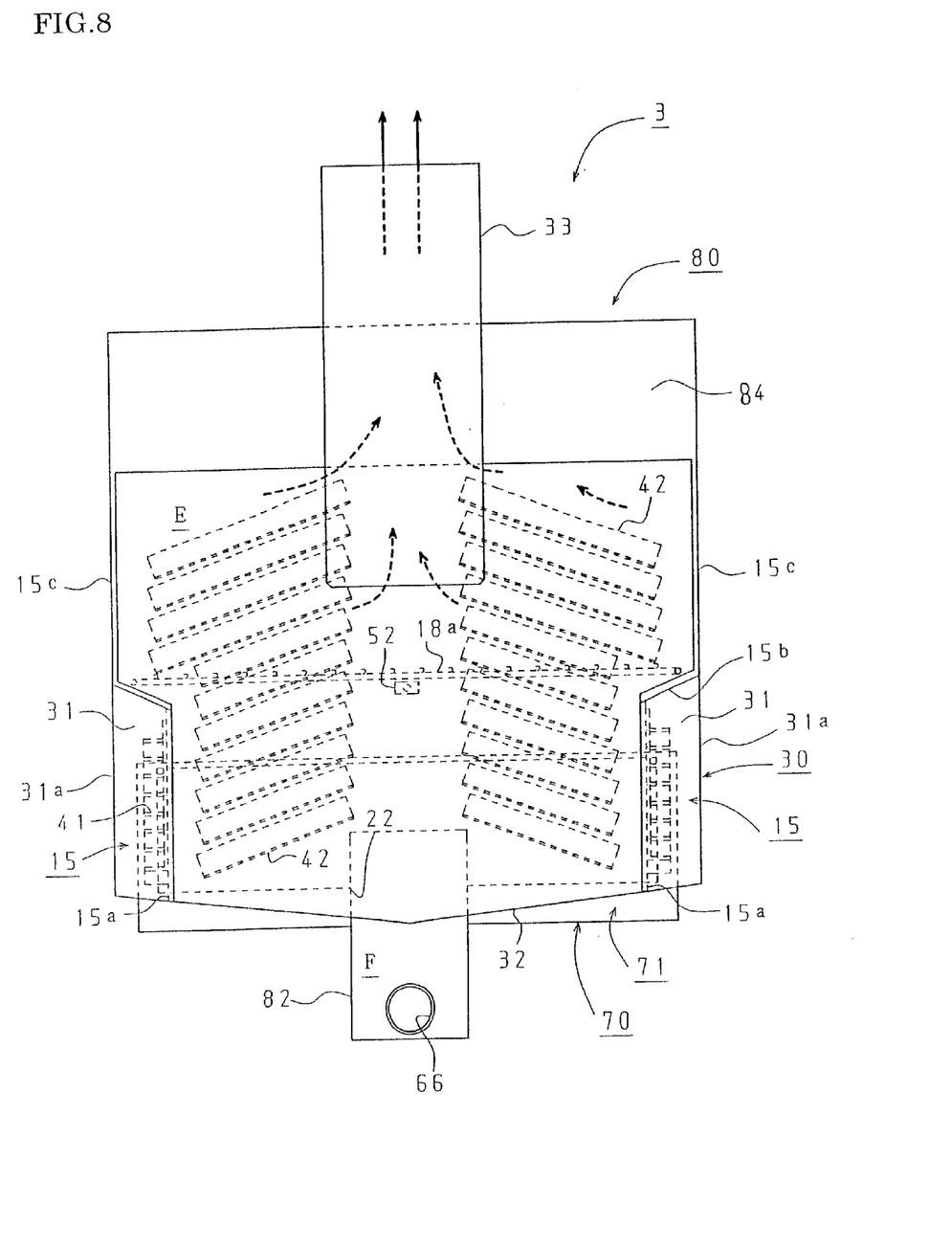
FIG. 8 is a diagram of the fryer according to the third embodiment seen from behind.

A third embodiment will be explained next with reference to FIGS. 7 to 9. It should be noted that areas different from the first embodiment are explained, whereas overlapping areas are given the same numerals and their explanation has been omitted. A fryer 3 according to the third embodiment differs from the fryer 1 of the first embodiment primarily in the configuration of its oil sediment holding portion.

Figure 9:
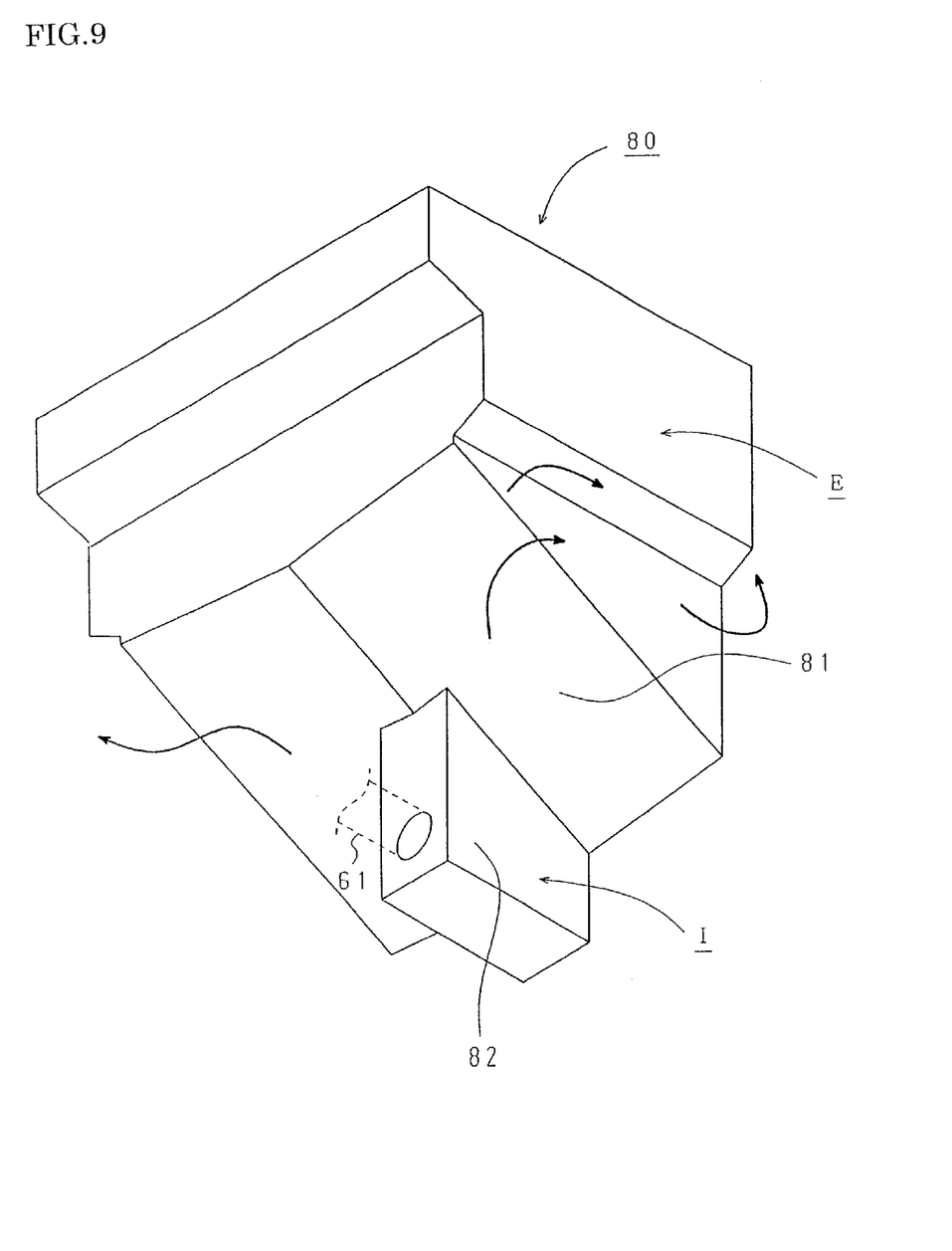
FIG. 9 is a perspective view of the oil vat of the third embodiment viewed downward toward the front.

An oil sediment holding portion 82 is formed in the center in the width direction of an oil vat 80 of the fryer 3, and, as shown in FIG. 9, its depth reaches from the bottom end (oil vat rear wall portion 84) of an oil vat bottom wall portion 81 to near the center of the oil vat in the length direction. That is, the oil vat bottom wall portion 81 is shaped like a squared-off "U". The bottom wall portion 81 is formed sloping downward toward the center of the oil vat.

A burner 70 is provided at a predetermined spacing from the bottom wall portion 81, and a combustion chamber 71 is formed between the burner 70 and the bottom wall portion 81. The burner 70 is provided with a ceramic plate 72 that has a combustion surface in opposition to the entire bottom wall portion 81.

With the fryer 3 with the above configuration, because the oil vat bottom wall portion 81 slopes down toward the center in the width direction, oil sediment is easily collected in the centrally located oil sediment holding portion 82, and it is possible to slow down the progress of cooking oil deterioration.

Also, because the oil sediment holding portion 82 is formed from the center portion in the length direction to the oil vat rear wall portion 84, oil sediment that sinks near the center in the width direction drops directly into the oil sediment holding portion 82 without sliding down to the oil vat rear wall portion 84, and therefore can accumulate in a short period of time. Consequently, the cooking oil does not easily deteriorate.

Furthermore, as the burner 70 is formed extending to the oil vat rear wall portion 84, the rear portion of the cooking zone E is adequately heated.

The above description of embodiments of the present invention has in no way been provided for the purpose of limiting the present invention, and it is of course possible to diversely embody the present invention within a scope that does not depart from the essential points of the present invention.

For example, when there is leeway in the space for disposing the fryer, the exhaust duct can be provided so as to encircle not only the heating zone but also the entire perimeter of the cooking zone, in which case the heat exchange is further promoted and the thermal efficiency becomes even higher.

In the fryer of the third embodiment, it is also possible to provide the oil sediment holding portion 82 on either the right or left side of the oil vat bottom wall portion 81, and there is no limitation to the center.

As described in detail in the above, the fryer according to claim 1 of the present invention is provided with a burner in opposition to the bottom wall portion of an oil vat, as well as an exhaust duct for conveying combustion gas around the periphery of the oil vat for the purpose of heat exchange. Consequently, there is little heat lost and it is possible to secure a large heat-receiving area, and thus thermal efficiency is high.

The result is that it is not necessary to provide a plurality of burners, so that production costs can be kept down and energy is saved.

Furthermore, the fryer according to claim 2 of the present invention has an oil sediment holding portion extending from left to right, and therefore the area in front of the oil sediment holding portion can be used as the united space for disposing a burner, and moreover the cooking oil can be adequately heated.

Furthermore, the fryer according to claim 3 of the present invention has an oil sediment holding portion which extends from left to right, and therefore even if it is partitioned into left and right portions by a partitioning plate, each portion is wide enough that cleanup is easy.

What is claimed is:

1. A fryer comprising:
   a box-shaped oil vat into which cooking oil is filled and having left and right side wall portions, a front wall portion, a rear wall portion, and a bottom wall portion, wherein the bottom wall portion is sloped downward in a rearward direction, and an oil sediment holding portion for holding oil sediment is formed at a lower end of the bottom wall portion;

a burner, which is provided in opposition to the oil vat bottom wall portion from the outside and which heats the bottom wall portion by combustion;

an exhaust duct, including left and right ducts and a rear duct, said rear duct being adjacent to said rear wall portion of said oil vat, for heat exchange, which brings combustion gas from the burner into contact with the left and right side wall portions and the rear wall portion of the oil vat thereby heating the left and right side wall portions and rear wall portion of the oil vat;

an exhaust flue, connected with an upper portion of said rear duct, having an opening at an upper end for discharging said combustion gas delivered to said rear duct from said left and right ducts through said opening to outside said fryer; and said bottom wall portion of said box-shaped oil vat slopes downward toward a bottom end of said rear duct.

2. The fryer according to claim 1, wherein a predetermined gap extending from left to right is provided between the lower end of the bottom wall portion of the oil vat and the rear wall portion of the oil vat, and the oil sediment holding portion is formed in this gap.

3. The fryer according to claim 1, wherein a partitioning plate is provided for partitioning the oil vat, which has the oil sediment holding portion extending from left to right, into left and right oil vat portions, and the left and right oil vat portions are independently heated by the burner.

* * * * *